July 26, 1955 G. HERZOG 2,714,167
LIQUID LEVEL MEASURING APPARATUS
Filed April 11, 1950
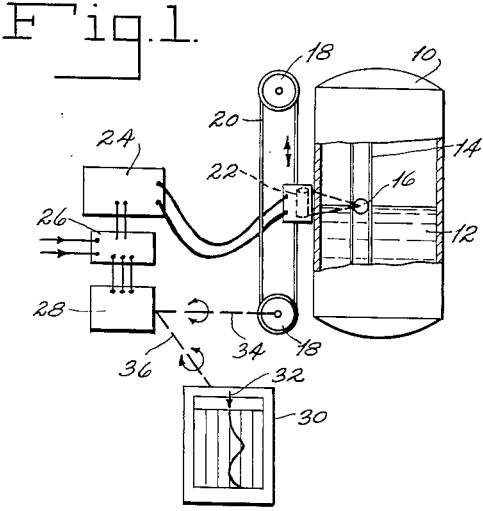
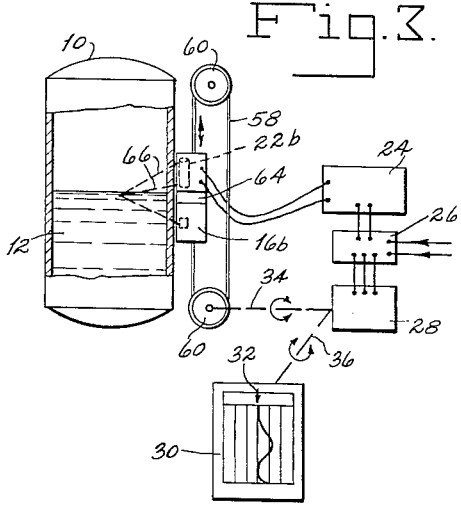
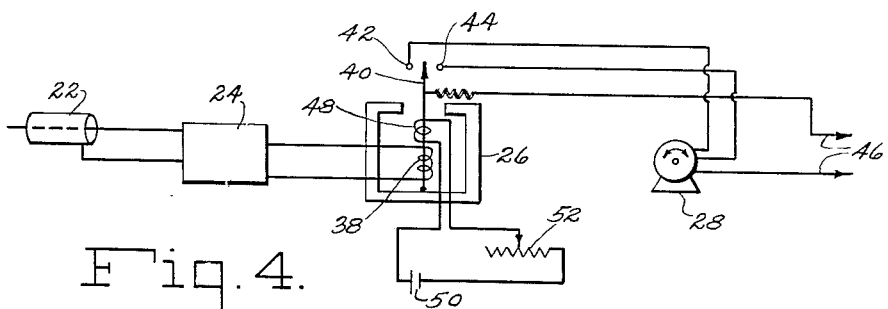
INVENTOR.
GERHARD HERZOG
BY Daniel Stryker
J. H. Graham
ATTORNEYS 2,714,167

LIQUID LEVEL MEASURING APPARATUS

Gerhard Herzog, Houston, Tex., assignor to The Texas Company, New York, N. Y., a corporation of Delaware Application April 11, 1950, Serial No. 155,257

7 Claims. (Cl. 250—43.5)

This invention relates to the measuring of liquid level in a tank, vessel or other container such as a gauge glass or the like and more particularly to a method in which the rise or fall of the liquid causes a change in the response of a detector of penetrative radiation, the arrangement being such that a motor actuated in accordance with the detector response is connected mechanically by suitable means so that it maintains the radiation detector opposite the liquid level and at the same time actuates a chart recorder to record the vertical position or height of the detector at all times.

In the U. S. Letters Patent No. 2,456,233 granted December 14, 1948, to Alexander Wolf a system is disclosed for measuring liquid level by radioactive means. A hollow sphere containing a small amount of a radioactive substance such as radium is confined between vertical guides inside a liquid containing tank and is adapted to float upon the liquid. A radiation detector such as a gamma ray counter is adapted to be moved manually in a vertical direction along the outside surface of the tank and when the detector is opposite the radioactive source the increased response or output of the detector is observed and a notation may be made of the height of the sphere and thus the liquid level at that time. The Wolf patent also discloses another embodiment in which the detector is fixed at the outer surface of the tank at a position where it is desired to maintain the liquid level. If the liquid level falls below the desired point a relay is actuated to control an electrical circuit to a solenoid operated valve in the intake line to the tank thus causing additional liquid to flow into the tank to raise the liquid level again. The present invention relates to an improvement on the systems disclosed in the Wolf patent.

In accordance with one embodiment of the invention a float containing a radioactive source is adapted to float on the liquid within a vessel and to remain at all times at the level of the liquid within the tank. Outside the tank a radiation detector is supported so that it can be moved up or down in a path parallel to that of the float. The output of the detector is amplified and passed to a polarized relay controlling the circuit to a reversible motor. The motor is connected mechanically to drive the detector supporting means and also the pen of a constant speed chart recorder and the arrangement is such that when the liquid level within the tank changes the motor will automatically drive the detector supporting means upwardly or downwardly to cause the detector to follow and to remain horizontally opposite the radioactive float. Since the motor also controls the actuation of the pen on the recorder chart a record will be made of the position of the detector, and thus the liquid level, at all times.

In another embodiment of the invention, a radio-active source and a detector are disposed at opposite sides of a tank so that they can both be moved up and down while remaining horizontally opposite each other and opposite the liquid level within the tank. The motor which drives the source and detector supporting means also actuates a recorder which indicates the vertical position of the source and detector as well as the liquid level.

In still another embodiment of the invention, both the source and detector are disposed close together on a vertically movable supporting means and the detector responds to radiation from the source passing into and scattered by the material within the tank. As is in the embodiments described above a motor is actuated in accordance with the response of the detector to drive the supporting means so that the source-detector unit will follow the movements of the liquid level while the pen on a recorder is simultaneously actuated to show the position of the source-detector unit.

For a better understanding of the invention reference may be had to the accompanying drawing in which Figure 1 is a somewhat diagrammatical vertical sectional elevation through a tank containing liquid and in which a radiation detector follows the liquid level within the tank;

Figure 2 is a view similar to Figure 1 but showing the source and detector supported at opposite sides of the tank;

Figure 3 is a view also similar to Figure 1 but in which the detector measures scattered rather than transmitted radiation; and, Figure 4 is a schematic illustration of a portion of the electrical connections.

Referring to Figure 1 of the drawing, a tank or vessel 10 is shown as containing a liquid 12 the level of which it is desired to record. Within the tank 10 is a plurality of wires or rods 14 which serve to confine to a vertical path floats 16 containing a small amount of a source of radioactivity such as radium. Mounted outside the tank 10 on a pair of pulleys 18 is a belt member 20, the arrangement being such that the belt is parallel to the path of movement of the source 16 within the tank. Secured to the belt 20 in a suitable container is a radiation detector such as a gamma ray counter 22 and flexible connecting leads conduct the output of the detector to a suitable amplifier and integration circuit 24 by means of which, as is well known, a direct current can be produced, the amplitude of which will vary with the response of the radiation detector. The output of the amplifier 24 passes to a polarized relay 26 which will be described with reference to Figure 4, this relay being connected in circuit with a reversible motor 28. If desired, the amplifier 24 may be housed in the movable container with the detector 20 with flexible leads connecting it with the relay 26. A recording device 30 which is preferably a constant speed chart recorder in which the chart is driven continously and uniformly by means of a clockwork or other mechanism is provided with a laterally movable pen indicated at 32. The motor 28 is connected by any suitable mechanical means as indicated diagrammatically at 34 to drive one of the pulleys 18 and by other means indicated at 36 to actuate simultaneously the recorder pen 32.

With reference to Figure 4, the radiation detector 22 which may be of the counter or pulse-producing type has its output connected to the amplifier and integrator 24. The output of the device 24 is passed through the actuating coil 38 of a polarized relay 26, the coil 38 surrounding the armature 40 which is adapted to engage with the contact 42 or the contact 44 connected in the power circuit of the reversible motor 28. One lead from a source indicated at 46 is connected to the armature 40 and the other lead directly to the motor 28. Also surrounding the relay armature 40 is biasing coil 48 connected in series with a direct current source 50 and a current controlling device 52. As is well understood, the coils 38 are so wound that for a predetermined current flowing through the coil 38, the current from the source 50 can be adjusted by the device 52 so that the armature 40 will remain at mid-position between the contacts 42 and 44. If, however, the current flow through the coil 38 due to a change in output of the detector 22 decreases or increases, the balance of the relay will be upset and the armature 40 will engage one of the contacts 42 or 44 so that the motor 28 will be energized and actuated in one direction or the other depending upon which of the two contacts 42 and 44 is engaged by the armature.

Referring again to Figure 1, it will be noted that in the position shown, the level of the liquid 12 is opposite the center of the detector 22 which is mounted in a vertical position. In this position some of the rays from the source 16 will travel through the air or gas above the liquid to strike the upper half of the detector and other rays will pass through the liquid itself to strike the lower half of the detector. The detector will then have a certain output due to the total radiation intercepted from the source and the circuits including the current control device 52 of the relay 26 will be preadjusted so that the relay armature 40 will remain midway between the contacts 42 and 44 when the parts are as shown in Figure 1, i. e., with the liquid level midway between the ends of the detector 22. Assuming that the liquid level drops there will be less or no liquid between the source 16 and any part of the detector 22 and the detector response will therefore increase since the radiataion from the source passes more easily through the air than through the liquid. This increase in detector response will cause the armature 40 of the relay to close one or the other of the contacts 42 and 44 to energize the motor 28 to drive the pulley 18 in a direction to lower the detector 22 until the liquid 12 again covers or shadows the lower half of the detector. At this point equilibrium will again be reached, the relay 26 being open. If the liquid 12 rises, all or most of the detector 22 will be shadowed by the liquid and since a considerable proportion of the radiation from the source 16 will be absorbed in the liquid before it reaches the detector, the detector response will decrease, thus causing the other relay contact 42 or 44 to be engaged by the armature 40 so that the motor will operate in the opposite directions to raise the detector 22 until again the liquid level shadows half of the detector.

Simultaneously with the motor operations described above the motor will actuate the pen 32 of the recorder to move it laterally of the chart thus producing a record on the chart of the position of the detector 22. It is understood that the chart will be calibrated and provided with indicia, not shown, corresponding to the height of the tank 10 so that the position of the pen mark on the chart at any time can be read directly in terms of the vertical height of the detector 22 along the tank 10.

In Figure 2 is shown a modification generally similar to Figure 1 but in which instead of the source being disposed in a float on the liquid it is mounted for vertical movement along the side of the tank opposite the detector. As shown in this figure a detector 22 is supported on the belt 20 passing over pulleys 18 and the output of the detector is connected to an amplifier and integration circuit 24 the output of which passes to a polarized relay 26 which controls a circuit leading to a motor 28. These parts are substantially as have already been described in connection with Figure 1. In this embodiment, however, the source of radiation 16a is also mounted on a belt 54 passing over pulleys 56, the two belts 54 and 20 being parallel to each other and close to opposite sides of the tank 10. As was described with reference to Figure 1, some of the rays from the source 16a pass through the liquid 12 to the lower half of the detector 22 and other rays pass to the outer half of the detector above the level of the liquid. In this case the motor 28 is connected by any suitable means so that when it is actuated it will drive both of the lower pulleys 18 and 56 to raise or lower simultaneously the source 16a and the detector 22 while at the same time the motor drives the pen arm 32 of the constant speed chart recorder 30. If desired, as in a case where the tank 10 has a large diameter, instead of mounting the source directly opposite the detector, it may be mounted at one side of the tank, it being necessary merely that the radiation from the source passes to the detector through the liquid level.

In the operation of the embodiment shown in Figure 2 it is assumed that the relay 26, particularly the current control device 52 is adjusted so that when the source and detector are opposite the liquid level the relay contacts will be open and the motor 28 will not be energized. If the level of the liquid 12 drops, more than half of the detector 22 will be exposed to the gamma rays passing through the air or gas above the liquid and since this air or gas will absorb a lesser amount of the gamma rays than does the liquid 12 the response of the detector 22 will increase, thus tripping the relay 26 as has been described with reference to Figure 1, to energize the motor 28 which then actuates or drives the lower pulleys 18 and 56 to lower the source 16a and detector 22 until they are again opposite the level of the liquid. At this time the response of the detector 22 will decrease sufficiently for the relay 26 to again open its contacts and the motor 28 will stop. Assuming that the level of the liquid 12 rises, the same operation will take place in a reverse direction, that is, more of the gamma rays will be absorbed in the liquid 12, the response of the detector 22 will decrease, the relay 26 will close and cause the motor 28 to be actuated in the opposite direction so as to raise the source and the detector to points opposite the level of the liquid. During both of these operations the motor will also actuate the pen arm 32 to move laterally with respect to the moving chart and the height of the source and the detector along the tank 10 will therefore be recorded.

In Figure 3 is shown another embodiment which in many respects is similar to those already described but in which the source 16b and the detector 22b are mounted close together on a single belt 58 passing over pulleys 60. In this case the source 16b is separated from the detector 22b by a layer of gamma ray absorbing material such as lead 64 to prevent gamma rays from the source from passing directly to the detector. As has been previously described, the output of the detector 22b passes to the amplifier-integration circuit 24 which is connected to the relay 26 controlling the circuit to the motor 28. The motor is connected by any suitable means to the lower pulley 60 and to the pen arm 32 of the constant speed chart recorder 30.

In the operation of the embodiment illustrated in Figure 3, the detector 22b responds to those gamma rays which pass from the source 16b into the interior of the tank 10 and which are scattered in the material within the tank and back to the detector 22b along the dotted line 66. With the parts in the position shown in Figure 3 the relay 26 is adjusted so that the contacts will be open and the parts remain at rest. Assuming, however, that the level of the liquid 12 falls, the output of the detector 22b will decrease since a lesser amount of the gamma rays will be scattered back to the detector from the air or gas in the tank above the level of the liquid. The operation is substantially the same as that described with reference to Figures 1 and 2, i. e., if the response of the detector 22b decreases, the relay armature 40 will be moved to engage one of the contacts 42 or 44 in the power circuit to the motor 28 and the motor will be actuated in a direction to drive the pulley 60 to lower the source-detector unit to a point opposite the liquid level at which time the detector response will increase sufficiently to permit the relay armature 40 to return to its original position thus de-energizing the motor 28. If the liquid level should rise within the tank 10, the output of the detector 22b will increase since more of the gamma rays will be scattered within the liquid and back to the detector. The operation then takes place again in the reverse direction so that the source-detector unit will be raised to a point opposite the liquid level at which point the parts again come to rest. In both of these operations as has been described hereinbefore, the motor 28 also actuates the pen arm 32 to record the vertical position of the source-detector unit along the surface of the tank 10.

Although the receptacle 10 has been described as a liquid containing tank or vessel, it is understood that the invention is applicable to use with a gauge glass or any pipe or tube in which the level of a liquid or a fluid powder may move. Again, instead of suitable mechanical means connecting the reversible motor with the driving pulleys and the pen of the recorder, electrical means such as a suitable telemetering system utilizing Selsyn motors may be used to transmit the motion between the motor and these elements.

It is to be understood that the broad concept of the invention resides in having the radiation detector or the source and the detector move upwardly and downwardly automatically in accordance with movement of the liquid level while simultaneously recording on a moving chart the vertical movements of the detector.

Obviously, many other modifications and variations of the invention as hereinbefore set forth may be made without departing from the spirit and scope thereof, and therefore, only such limitations should be imposed as are indicated in the appended claims.

I claim:

1. A device for indicating liquid level in a vessel comprising a source of radiation and a radiation detector disposed normally substantially at the liquid level, means for moving said source and detector in a vertical direction, said detector being responsive to radiation from said source, amplifying means for said detector response, a reversible electric motor, a source of electrical supply for said motor, a polarized relay connected to said amplifying means and between said motor and said motor supply source and adapted to energize said motor in a direction corresponding to an increase or a decrease in the response of said detector caused by a change in said liquid level, a constant speed chart recorder having a pen arm, and actuating means connecting said motor with said means for moving said detector and with said pen arm, the arrangement being such that movements of the liquid between the source and detector produce changes in the detector response which cause said relay to energize said motor so as to drive said detector moving means in a direction to follow the liquid level and to drive said pen arm to record on said chart the movements of the detector and thus the height of the detector and the liquid level.

2. A device for indicating the liquid level in a vessel comprising a source of gamma rays adapted to float on the liquid in the vessel, a gamma ray detector disposed in predetermined relation to said source and outside and normally substantially opposite the liquid level in the vessel, means for supporting said detector for vertical movement, a reversible electric motor having its drive shaft connected to said supporting means and adapted to drive said supporting means to move said detector up or down depending upon the direction of rotation of the motor, a source of electricity connected in circuit to said motor, and a polarized relay connected in said motor circuit, said relay being connected to the output of said detector so that a change in detector output produced by a change in liquid level will energize said relay to actuate said motor in a direction to raise or lower said detector to follow the liquid level, the position of said detector with respect to the height of the vessel serving to indicate the position of the liquid level therein.

3. A device for recording the liquid level in a vessel comprising a source of gamma rays adapted to float on the liquid level in the vessel, a gamma ray detector disposed in predetermined relation to said source and outside and normally substantially opposite the liquid level in the vessel, means for supporting said detector for vertical movement, a reversible electric motor having its drive shaft connected to said supporting means and adapted to drive said supporting means to move said detector up or down depending upon the direction of rotation of the motor, a source of electricity connected in circuit to said motor, a polarized relay connected in said motor circuit, said relay being connected to the output of said detector so that a change in detector output produced by a change in liquid level will energize said relay to actuate said motor in a direction to raise or lower said detector to follow the liquid level, and a chart recorder having a pen arm connected to said motor to be driven thereby, said pen serving to record on said chart the vertical position of said detector and thereby the height of the liquid level in the vessel.

4. A device for recording the liquid level in a vessel comprising a hollow member containing a source of gamma rays and adapted to float on said liquid, means for guiding said float in a vertical path in said vessel, a gamma ray detector, means for supporting said detector outside said vessel and horizontally opposite said float member, a reversible motor connected to said supporting means for moving said detector vertically, a source of power supply for said motor, electrical connections between said detector and said motor power supply, and a chart recorder having a pen arm adapted to be actuated by said motor, the arrangement being such that when said floating gamma ray source tends to move away from said detector due to a change in the liquid level the change in detector output will cause said relay to energize said motor to drive said supporting means and cause said detector to follow the movement of the float, while at the same time the motor actuates said pen arm to record on the chart the movements of the float.

5. A device for recording the liquid level in a vessel having a vertical wall comprising a hollow member containing a source of gamma rays and adapted to float on said liquid, means for guiding said float in a vertical path in said vessel, a gamma ray detector, means for supporting said detector for vertical movement along the outer surface of said wall, means for amplifying the output of said detector, a reversible electric motor having its drive shaft connected to said support means to move said detector up or down depending upon the direction of rotation of the motor, a polarized relay in the power circuit to said motor, electrical connections between said amplifying means and said relay and a chart recorder having a pen arm connected to said motor shaft, the arrangement being such that when said floating gamma ray source tends to move away from said detector the change in detector output will cause said relay to connect the motor to its source of supply to drive said supporting means and cause said detector to follow the movement of the float, while at the same time the motor drives said pen arm to record on the chart the movements of the float.

6. A device for recording the liquid level in a vessel comprising a gamma ray source and a detector, a gamma ray shield between said source and detector; means for supporting said gamma source, shield and detector as a unit outside said vessel and horizontally opposite the liquid level therein whereby gamma rays from the source will enter said vessel, some being scattered therein and returned to said detector, a reversible motor connected to said supporting means and adapted to move said unit vertically, a source of electrical supply for said motor electrical connections including a polarized relay between said detector and said motor supply source, and a chart recorder having a pen arm adapted to be actuated by said motor, the arrangement being such that when said liquid level tends to move away from said unit the change in detector output due to a change in the scattering material within the vessel opposite said unit will cause said motor to drive said supporting means and cause said unit to follow the movement of the liquid level while at the same time the motor actuates said pen arm to record on the chart the movements of the unit and thereby the liquid level.

7. A device for recording the liquid level in a vessel having vertical walls comprising a source of gamma rays outside said vessel and opposite the liquid level therein, means for supporting said source for vertical movement, a gamma ray detector, means for supporting said detector for vertical movement along the outer surface of said wall opposite said vertically movable source, means for amplifying the output of said detector, a reversible electric motor having its drive shaft connected to both of said supporting means to move said source and detector up or down depending upon the direction of rotation of the motor, a polarized relay in the power circuit to said motor, electrical connections between said amplifying means and said relay, and a chart recorder having a pen arm connected to said motor shaft, the arrangement being such that when said liquid level tends to move upwardly or downwardly away from said source and detector the change in detector output due to the presence or absence of the liquid between the source and detector will cause said relay to connect the motor to its source of supply to drive both of said supporting means and cause said source and detector to follow the movement of the liquid level, while at the same time the motor will drive said pen arm to record on the chart the upward or downward movements of the supporting means and thus the liquid level in the vessel.

References Cited in the file of this patent

UNITED STATES PATENTS

| | | |
|---|---|---|
| 2,091,303 | Brelsford | Aug. 31, 1937 |
| 2,323,128 | Hare | June 29, 1943 |
| 2,337,608 | Hulsberg | Dec. 28, 1943 |
| 2,348,810 | Hare | May 16, 1944 |
| 2,359,927 | Melas | Oct. 10, 1944 |
| 2,394,220 | Wagner | Feb. 5, 1946 |
| 2,456,233 | Wolf | Dec. 14, 1948 |
| 2,555,674 | Carrick | June 5, 1951 |
| 2,567,823 | Needham | Sept. 11, 1951 |

FOREIGN PATENTS

| | | |
|---|---|---|
| 409,102 | Great Britain | Apr. 26, 1934 |